United States Patent [19]

Chen

[11] Patent Number: 5,347,918
[45] Date of Patent: Sep. 20, 1994

[54] VACUUM THERMAL COOKER

[76] Inventor: Po-Hung Chen, No. 2, Lane 242, Chung-Cheng S. Road, Yung-Kan Shian, Tainan Shien, Taiwan

[21] Appl. No.: 223,718

[22] Filed: Apr. 6, 1994

[51] Int. Cl.$^5$ ............ A47J 27/00; B65B 31/04; B65D 51/16; B65D 81/20

[52] U.S. Cl. .................. 99/472; 99/340; 99/403; 220/231; 220/912

[58] Field of Search ........... 99/340, 403, 472, 476, 99/646 C, 410–418; 126/369, 376, 377; 220/408, 428, 431, 231, 912; 141/65, 66; 206/524.8; 215/262

[56] References Cited

U.S. PATENT DOCUMENTS

| 303,014 | 8/1884 | Hoyt | 99/472 |
|---|---|---|---|
| 477,805 | 6/1892 | Isler | 99/472 |
| 1,152,308 | 8/1915 | Evans | 220/428 |
| 1,499,364 | 7/1924 | Goodrick | 126/377 |
| 1,648,725 | 11/1927 | Endicott | 220/408 |
| 2,960,250 | 11/1960 | Haloski | 220/231 |
| 4,093,009 | 6/1978 | Iavarone et al. | 99/472 |
| 4,287,819 | 9/1981 | Emerit | 141/65 |
| 5,031,519 | 7/1991 | Toida et al. | 99/340 |
| 5,195,427 | 3/1993 | Germano | 99/472 |
| 5,251,542 | 10/1993 | Itoh et al. | 99/403 |

FOREIGN PATENT DOCUMENTS

| 0524551 | 1/1993 | European Pat. Off. | 220/231 |
|---|---|---|---|
| 58342 | 11/1953 | France | 99/472 |

Primary Examiner—Timothy F. Simone

[57] ABSTRACT

A vacuum thermal cooker comprising an outer cooler, an inner cooker, a sealing lid unit and an insulating disc, the inner cooker being used for boiling food and then to be placed in the outer cooker sealed by the sealing lid unit and then the air in the outer cooker being sucked out by a separate simple sucking pump operated by hand, the interior of the outer cooker becoming vacuum so that the heat of the food and the inner cooker may be kept for a long period of time, not easily cooled off by function of the vacuum condition of the outer cooker.

1 Claim, 5 Drawing Sheets

VACUUM THERMAL COOKER

BACKGROUND OF THE INVENTION

Most known thermal cookers are generally comprise a cooker body and a lid made of heat preserving material, and boiled food is placed in the cooker body and closed up by the lid for keeping the food warm, hardly keeping the food to become quite well-done for eating. Especially, in a cold weather, the effect of thermal cooking is largely diminished.

SUMMARY OF THE INVENTION

This invention has been devised to offer a vacuum thermal cooker to keep heat of food placed in an inner cooker sealed in an outer cooker for a long period of time, and to let the food therein get well-done.

The vacuum thermal cooker in the present invention comprises an outer cooker, a sealing lid unit to be closed on the outer cooker, and an inner cooker for boiling food and to be placed inside the outer cooker after boiling. Then a separate simple air sucking pump is used to suck out the air in the outer cooker to make the interior of the outer cooker become almost vacuum so that the heat of the food and the inner cooker after coiled may not be conducted out through the air in the outer cooker and through the outer cooker itself. Then the heat of the food may not be cooled down by open air for a long period of time, cooking the food therein well-down for eating.

The main feature of the present invention is a sealing lid unit consisting of a lid, a small cap, an annular sealing gasket, an air seal, and a top cap combined together.

The lid has a recess in a center portion with a through hole in the center of the bottom of the recess, an annular projecting circumferential edge, two annular walls extending down from the annular projecting circumferential edge and forming an annular groove for the annular sealing gasket to engage therein, the recess having four air holes around the through hole and an annular projecting-down edge for the small cap to fit with.

The small cap has two air holes and engages with the annular projecting-down edge of the recess.

The annular sealing gasket fits in the annular groove of the lid to contact tightly with an inner upper circumferential surface of the outer cooker to prevent open air from flowing into the outer cooker after the air in the outer cooker has been sucked out, making the interior of the outer cooker almost vacuum.

The air seal fits in the recess and sits on its bottom, having a round block under the bottom to fit in the through hole of the recess and two connecting rods for manually moving the air seal to let open air to flow in the interior of the outer cooker.

The top cap has a circumferential edge to fit in the recess on the air seal, and two opposite slots for the two connecting rods of the air seal to pass through upward for being moved manually.

After the sealing lid unit is assembled together and put on the outer cooker, a separate air simple sucking pump is used to be placed on the recess, and operated to suck out the air in the outer cooker until the interior of the outer cooker becomes vacuum. Then the boiled food placed in the inner cooker can keep its own heat, which is hardly conducted out of the outer cooker, as the inner cooker is kept isolated from open air by the vacuum condition of the outer cooker.

DETAILED DESCRIPTION OF THE INVENTION

Figure 1:
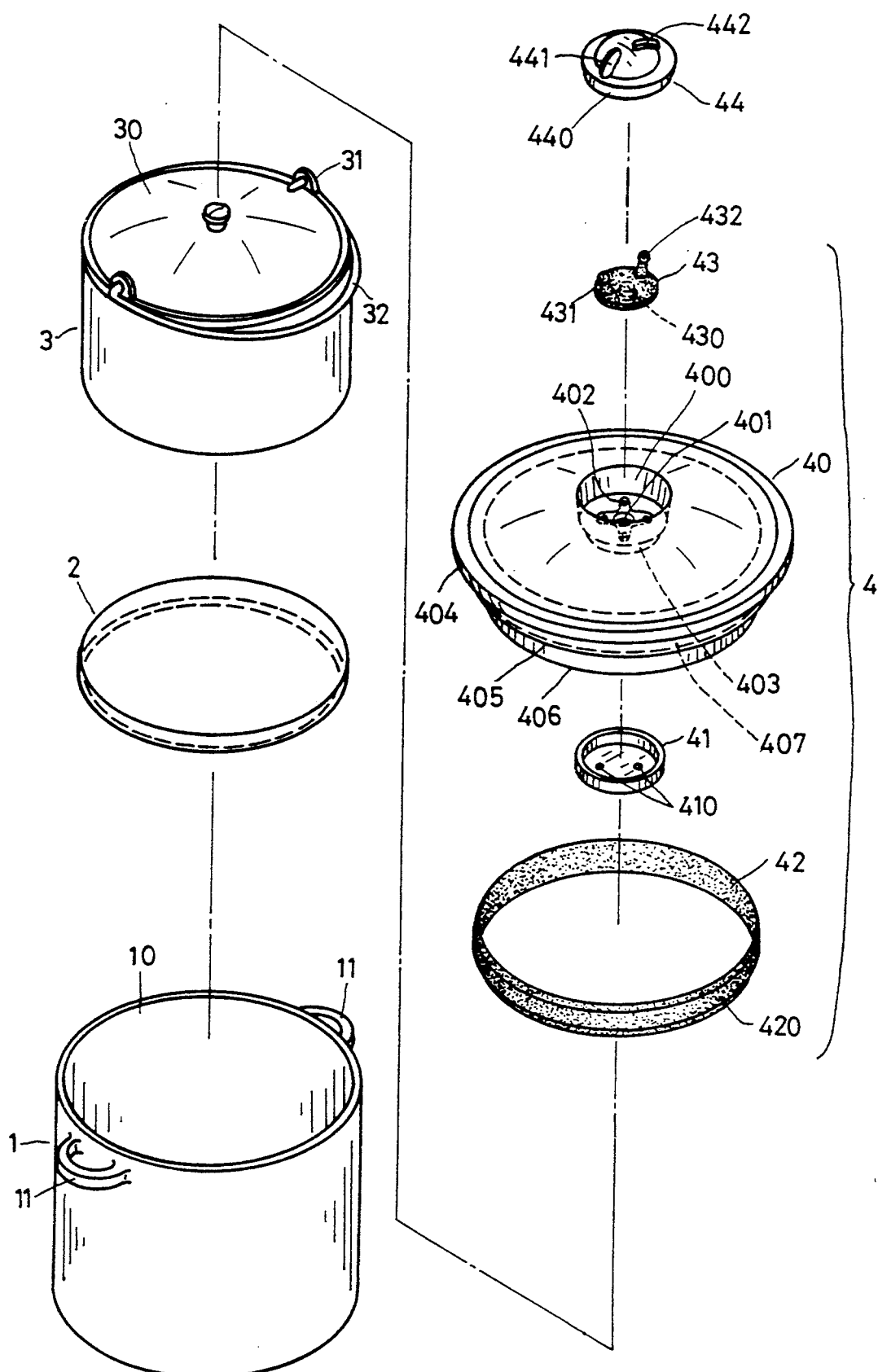
FIG. 1 is an exploded perspective view of a vacuum thermal cooker in the present invention.
Figure 2:
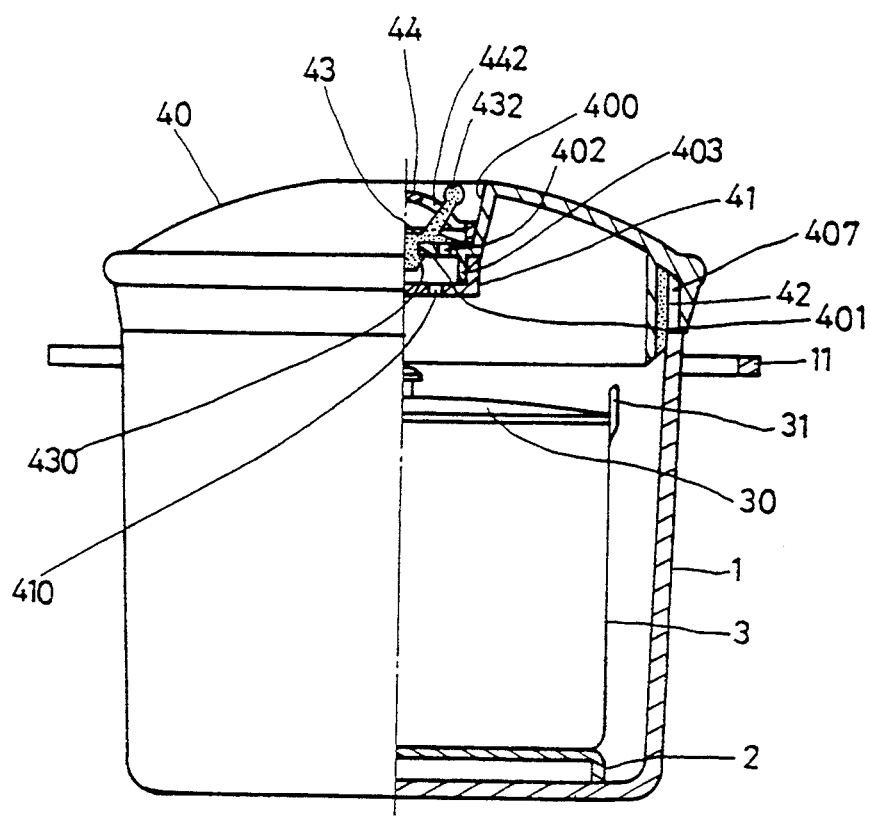
FIG. 2 is a cross-sectional view of a half side of the vacuum thermal cooker in the present invention.
Figure 3:
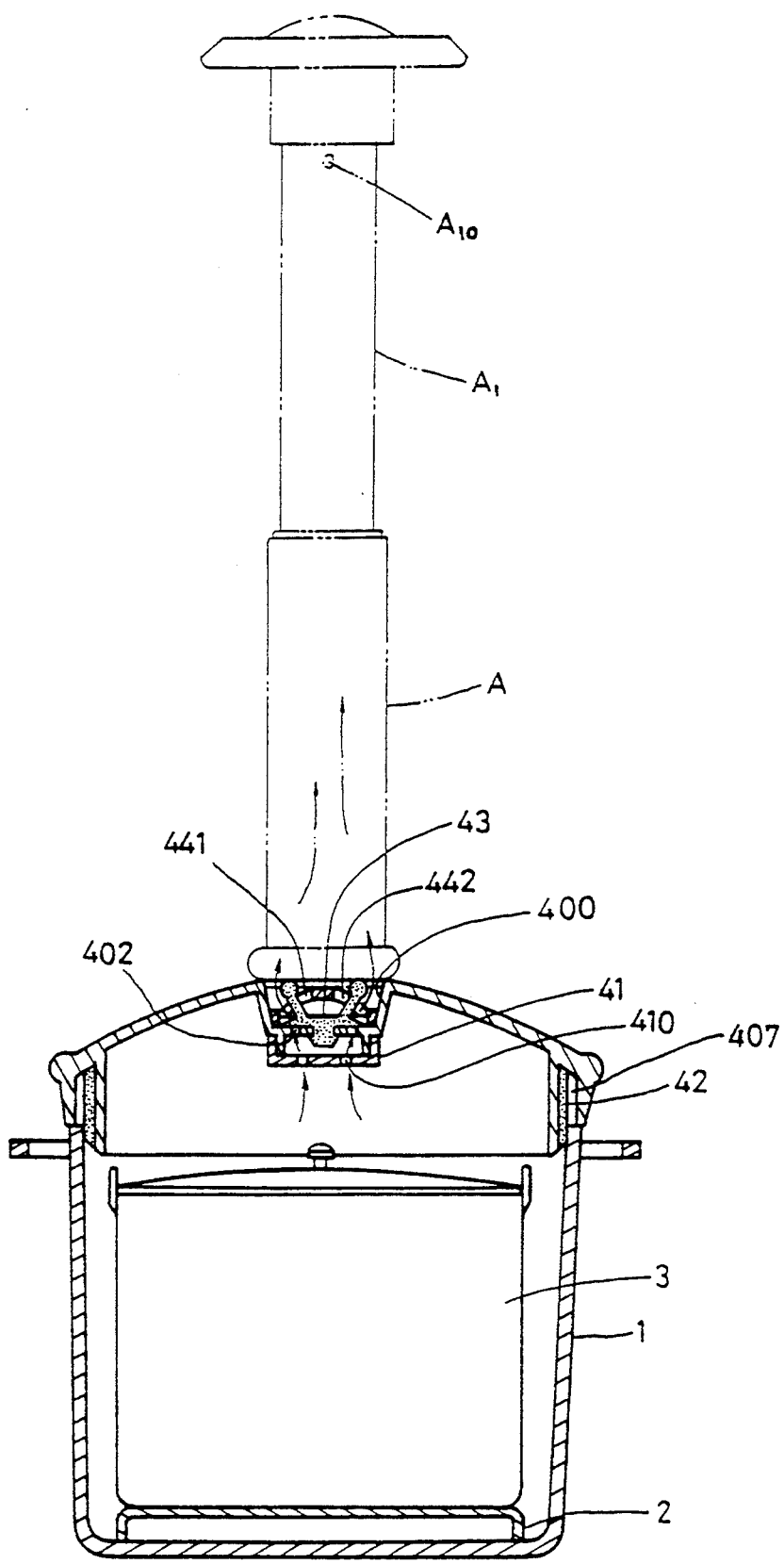
FIG. 3 is a front view of an air current of the vacuum thermal cooker in the present invention, when air is sucked out of an outer cooker.

A thermal cooker in the present invention, as shown in FIGS. 1-3, comprises an outer cooker 1 having an opening 10 in the top and two opposite grips 11 extending out from an upper wall, an insulating disc 2 made of a heat non-conductive material inner and placed on an inner bottom of the outer cooker 1, and an cooker 3 for boiling food and to be placed on the insulating disc 2 and having an upper lid 30 and a hole 31 each formed in a semi-round projection on two opposite upper edges and a large semi-circular handle 32 with both ends hooked in the two holes 31, 31.

The thermal cooker also comprises a sealing lid unit 4 closing the opening 10 of the cooker 1. The sealing lid unit 4 consists of a lid 40, a lower cap 41, an annular sealing gasket 42, an air seal 43, and a top cap 44.

The lid 40 has a recess 400 in the center portion, a through hole 401 in the center of the recess 400, four air holes 402 spaced equally around the through hole 401, an annular fitting wall 403 projecting down from the bottom of the recess 400, a circumferential upper edge 404, two annular wails 405. 406 extending down from the upper edge 404, an annular groove 407 formed between the two annular walls 405, 406. The lower cap 41 fits around the annular wall 403, having two air holes 41, 41. The annular sealing gasket 42 engages the annular groove 407, made of a soft rubber and having a flange 420 in an annular intermediate portion. The air seal 43 is made of soft rubber and fits in the recess 400, having an inverted mushroom shape and extending down from a bottom to fit through the center hole 401 and two inclined connecting rods 431, 432 extending upward. The top cap 44 has a swelled top, two opposite slots 441, 442 in the swelled top, and a circumferential vertical surface 440.

In assembling, first, the lower cap 41 is pushed to engage the annular fitting wall 403, and next the annular sealing gasket 42 is placed to engage the annular groove 407. Then the block 430 of the air seal 43 is inserted through the through hole 401, stopping under the hole 401, and letting the air seal 43 close the four air holes 402. After that, the slots 441. 442 of the top lid 44 are managed to pass through by the two inclined rods 431, 432. letting the top lid 44 fits exactly in the recess 400 on the air seal 43 and then the top lid 44 is to be welded with the lid 40. Thus the sealing lid unit 4 is completely assembled together.

Figure 4:
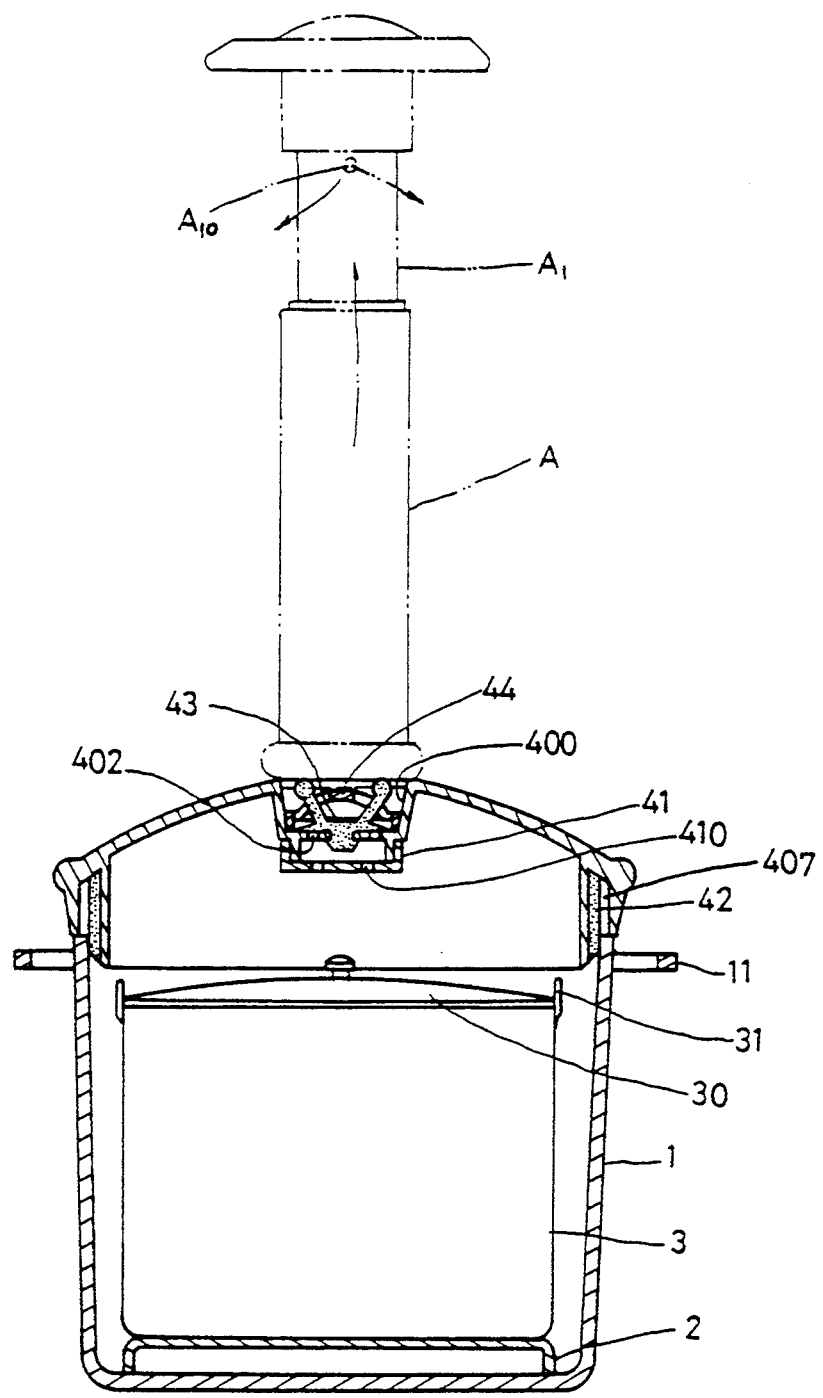
FIG. 4 is a front view of an air current of the vacuum thermal cooker in the present invention, when a pushing rod of an air sucking pump is pushed down.

In using, as shown in FIGS. 3 and 4, first, food to be cooked is to be placed in the inner cooker 3 and to be boiled properly, and then the inner cooker 3 is picked up by holding the handle 32. Then the inner cooker 3 is to be put on the insulating disc 2 in the outer cooker 1, and the sealing lid unit 4 is to be put to close on the opening 10 of the outer cooker 1. Then a separate air sucking pump A is placed on the recess 400, and then a air rod A1 of the air sucking pump A is pulled up to suck out the in the outer cooker 1. The air in the outer cooker 1 will flow orderly through the two air holes 410 of the lower cap 41, the four air holes 402, through a gap between the air seal 43 and the recess 400, the two slots 441. 442, and finally into the air sucking pump A. If the pulling rod A1 is pushed down, as shown in FIG. 4, the air coming from the outer cooker 1 in the airsucking pump A may be exhausted out of an outlet hole A10 of the pushing rod A1. Thus the air in the outer cooker 1 can be quickly sucked out air to become vacuum by operating the air sucking pump A. Then pressure inside of the cooker 1 turns out to be very lower than that outside the cooker 1 i.e. the atmosphere, the sealing gasket 42 is pushed by open air to close tightly the upper circumference of the outer cooker 1, not allowing open air to flow into the outer cooker 1. In addition, the air seal 43 is pressed by the pressure of open air (atmosphere) to close up tightly the four air holes 402 of the recess 400. So once the outer cooker 1 becomes vacuum, it may be kept such vacuum, with impossibility of air flowing into the outer cooker 1.

The inner cooker 3 is located on the separating disc 2, separated by the insulating disc 2 from the bottom of the outer cooker 1 so that the heat of the food in the inner cooker 3 cannot be conducted to the outer cooker, nor to the vacuum empty interior of the outer cooker 1, allowing the food therein being kept heated to get cooked for a long period of time.

Figure 5:
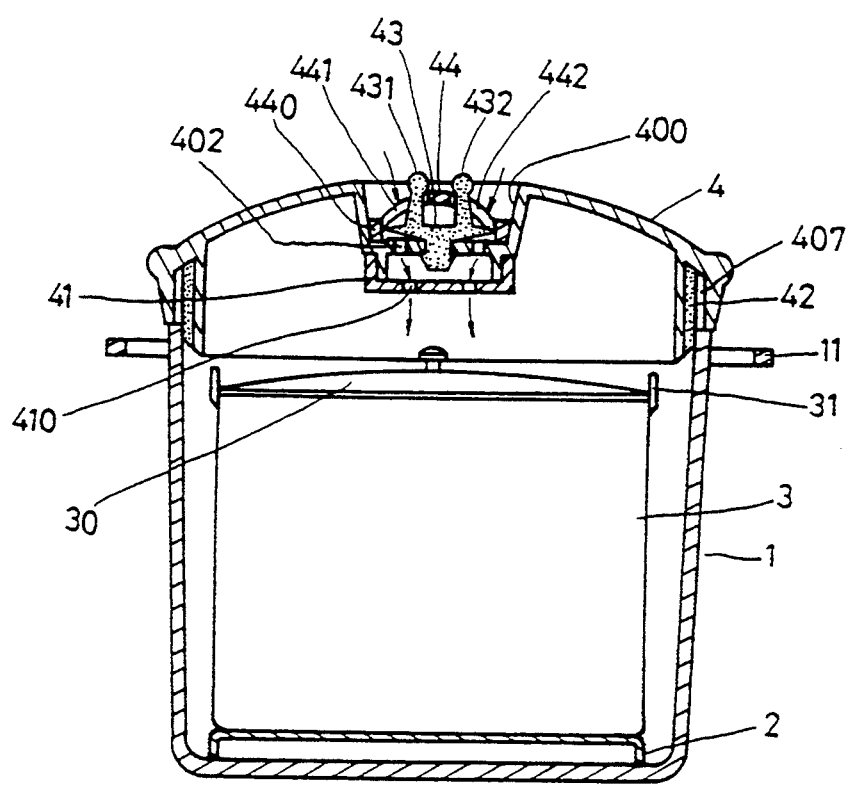
FIG. 5 is a cross-sectional view of the vacuum thermal cooker in the present invention, showing air flowing in the outer cooker when a sealing lid unit is opened.

If the food cooked in the inner cooker 3 is needed to be taken out, as shown in FIG. 5, either of the two connecting rods 431, 432 is moved inward in the slots 441, 442 of the top cam 44, letting a gap formed between the air seal 43 and the groove 400. Then open air may immediately flow through the gap and the slots 441, 442, the four air holes 402, the two air holes 410, 410 and then into the outer cooker 1 until the pressure inside the outer cooker 1 and the pressure of the open air become balanced, allowing the sealing gasket 42 not closely engage the outer surface of the outer cooker 1 so that the sealing lid unit 4 may be taken off. Then the food in the inner cooker 3 can be taken out for a meal.

As can be seen from the above description, this vacuum thermal cooker has advantages as listed below.

1. Air in the outer cooker can be sucked out almost completely to become vacuum, enabling the heat of the food in the inner cooker kept very long for cooking the food well-done or keeping the food warm very long by vacuum condition of the interior of the outer cooker.

2. The inner cooker 3 can be almost completely isolated from open air so that the heat of the food may not decrease easily, and the food does not need to be warmed once again in time of meal.

What is claimed is:

1. A vacuum thermal cooker comprising:
   an outer cooker having two opposite grips at an upper circumference;
   a separating disc made of heat non-conductive material and being placed on a bottom of the outer cooker;
   an inner cooker used for boiling food, being placed on the separating disc and having a lid, two semi-circular projections with a hole for two ends of a semi-circular handle for carrying this inner cooker;
   a sealing lid unit closing on top of the outer cooker and consisting of
   a lid having a recess in a center portion, a through hole in the center of the recess, four air holes equally spaced around said through hole in a bottom of the recess, an annular fitting wall extending down from the bottom of the recess, an outer circumferential projecting edge, two annular walls extending down from the outer projecting edge and forming an annular groove between them;
   a lower cap provided to engage the annular fitting wall from below, having air holes in its bottom;
   an annular sealing gasket provided to engage the annular groove of the sealing lid, having a flange in an intermediate portion;
   an air seal provided to fit in the recess of the sealing lid, having an inverted mushroom-shaped block under its bottom to fit through said through hole of the recess and two inclined connecting rods extending upward;
   a top cap provided to fit in recess and to close on the air seal, having two opposite slots for the two connecting rods to pass through up and an outer surface for fitting with said recess; and
   air in said outer cooker being sucked out by means of a separate air sucking pump, which is placed on said recess of said sealing lid, the inner pressure of said outer cooker getting lower than that of open air by operating said air sucking pump to force said sealing lid unit tightly to close up the outer cooker, said outer cooker becoming a vacuum with open air prevented from flowing inside, said inner cooker being not in direct contact with the outer cooker by the insulating disc so that the heat of the food therein can be kept from conducted to disperse out of the outer cooker for a period of time long enough for cooking the food therein well-done or for keeping the food warm.

* * * * *